United States Patent
Tanihara

Patent Number: 5,601,722
Date of Patent: Feb. 11, 1997

[54] METHOD FOR THE PREPARATION OF AN ION EXCHANGER FOR CESIUM IONS AND METHOD FOR THE REGENERATION THEREOF

[75] Inventor: Koichi Tanihara, Tosu, Japan

[73] Assignee: Agency of Industrial Science and Technology, Tokyo-to, Japan

[21] Appl. No.: 554,980

[22] Filed: Nov. 13, 1995

[51] Int. Cl.$^6$ .................................................. F23G 7/00
[52] U.S. Cl. .................. 210/673; 210/670; 521/25; 521/26; 521/28; 521/30
[58] Field of Search ................. 521/25, 26, 28, 521/30; 210/670, 673

[56] References Cited

U.S. PATENT DOCUMENTS 4,628,837  12/1986  More et al. .................. 110/346
5,489,370  2/1996  Lomasney et al. .................. 204/627

*Primary Examiner*—Arun S. Phasge
*Attorney, Agent, or Firm*— Wenderoth, Lind & Ponack

[57] ABSTRACT

Proposed is a method for the preparation of an efficient ion exchanger useful for separation and recovery of cesium ions from an aqueous solution such as strongly acidic waste solutions containing radioactive species of cesium. The method comprises the steps of (a) adsorption of hexacyanoferrate (II) ions on to porous particles of an anion exchange resin, (b) conversion of the hexacyanoferrate (II) ions into water-insoluble copper salt thereof in situ in the resin pores, (c) an oxidation treatment of the resin particles and (d) a reduction treatment in the presence of potassium ions followed by contacting of the resin particles with an aqueous solution containing copper ions. A method for the regeneration of the ion exchanger after adsorption of cesium ions is also proposed.

6 Claims, 1 Drawing Sheet

METHOD FOR THE PREPARATION OF AN ION EXCHANGER FOR CESIUM IONS AND METHOD FOR THE REGENERATION THEREOF

BACKGROUND OF THE INVENTION

The present invention relates to a method for the preparation of an ion exchanger for cesium ions and a method for the regeneration of the ion exchanger having cesium ions adsorbed thereon. More particularly, the invention relates to a method for the preparation of an ion exchanger suitable for the process of ion exchange separation of cesium ions, for example, from an aqueous solution of radioactive waste materials as well as to a method for the regeneration of the ion exchanger after adsorption of cesium ions thereon.

As is known, one of the very important problems in the technology for the disposal of radioactive waste materials as well as for the utilization of radioactive materials is the technology for the separation and recovery of radioactive cesium ions in an aqueous solution such as those discharged in large volumes from various facilities for the utilization of atomic power including the plants for reprocessing of spent nuclear fuels.

Such an aqueous waste solution in general characteristically is strongly acidic with nitric acid or contains a large amount of sodium nitrate so that the method for the separation of radioactive cesium ions must comply with this unique condition of the aqueous waste solutions. Various methods therefor have been proposed heretofore including the precipitation method, solvent-extraction method, ion-exchange method and so on although none of these prior art methods is quite satisfactory as an industrial process. Some of the difficulties encountered in these prior art methods include increase in the amount of secondary waste materials and consumption of a large amount of chemical reagents not re-utilizable resulting in an undue increase in the salt concentration in the solution after treatment by the decomposition products as well as the adverse influences caused on the downstream processes by the complicated decomposition treatment undertaken for the removal of the salt in the solution under treatment. Taking the ion-exchange method as an example, one of the reasons in principle for these problems is the difficulty in the desorption and recovery of cesium ions selectively adsorbed on an ion exchanger in the presence of a large amount of electrolytes.

The inventor has previously proposed, in Japanese Patent Kokai 5-254828, that, by the use of a specific hexacyanoferrate (II) capable of selectively adsorbing cesium ions by ion exchange, an efficient method for the adsorption and desorption of cesium ions on and from such an ion exchanger of the oxidation-reduction type enabling repeated use thereof in view of the possibility to overcome the above mentioned difficulties by the utilization of the function for oxidation-reduction which an insoluble body of the ion exchanger possesses. This prior art method is particularly effective for the copper hexacyanoferrate (II) and is characterized in that cesium ions in an aqueous solution containing nitric acid in a high concentration can be efficiently adsorbed on to the ion exchanger in a reduced state (in the presence of an oxidation-preventing agent or nitrous acid remover in the former case) followed by the oxidation treatment of the ion exchanger with an aqueous nitric acid solution containing nitrous acid to effect efficient desorption of the cesium ions while the ion exchanger in an oxidized state can be regenerated by the treatment with a reducing agent such as a hydrazinium salt so that the ion exchanger can be used repeatedly with a remarkably small amount of waste materials to be disposed.

A presumable scheme in the above mentioned prior art method for the steps of adsorption of cesium ions on the ion exchanger, desorption of the cesium ions from the ion exchanger with nitric acid and regeneration of the ion exchanger with a reducing agent includes the following reaction equations (1), (2) and (3), respectively:

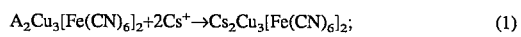

$$A_2Cu_3[Fe(CN)_6]_2 + 2Cs^+ \rightarrow Cs_2Cu_3[Fe(CN)_6]_2; \quad (1)$$

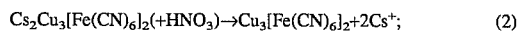

$$Cs_2Cu_3[Fe(CN)_6]_2(+HNO_3) \rightarrow Cu_3[Fe(CN)_6]_2 + 2Cs^+; \quad (2)$$

and

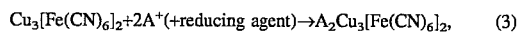

$$Cu_3[Fe(CN)_6]_2 + 2A^+(+\text{reducing agent}) \rightarrow A_2Cu_3[Fe(CN)_6]_2, \quad (3)$$

in which $A^+$ is a monovalent cation which can be a hydrogen ion or a cation such as an ammonium ion as a decomposition product from the hydrazinium salt as the reducing agent when reduction is performed in an acidic condition under a stationary state.

A problem to be solved in the above described prior art method is that the insoluble hexacyanoferrates in general can be obtained only in the form of a fine powder so that difficulties are encountered in the solid-liquid separation of the ion exchanger from the liquid medium. In this connection, a suggestive teaching is obtained from Journal of Nuclear Science and Technology, volume 4, No. 4, pages 190–194 (1967) which discloses an adsorbent for cesium ions prepared by the deposition of copper hexacyanoferrate (II) in the pores of a porous anion exchange resin. The inventor attempted a test for the applicability of the above described prior art method to this adsorbent which could assumably be an ion exchanger of the oxidation-reduction type only to find that adsorptivity of cesium ions in the first time is low as compared with the adsorptivity in the second time and later on and that elution of a considerably large amount of hexacyanoferrate ions takes place into the solution for the adsorption treatment and the solution obtained by the desorption treatment in the second time and later on resulting in depletion of the ion exchanger.

SUMMARY OF THE INVENTION

The present invention accordingly has an object to provide a water-insoluble copper hexacyanoferrate (II) supported within the pores of a porous anion exchange resin and capable of exhibiting high adsorptivity for cesium ions already at the initial stage of the first-time adsorption treatment and also to provide a method for the regeneration of such an ion exchanger with little depletion of the water-insoluble copper hexacyanoferrate (II) as the effective constituent thereof when the ion exchanger is used repeatedly.

Thus, the method provided by the present invention for the preparation of an ion exchanger for cesium ions consisting of a porous anion exchange resin supporting a water-insoluble copper hexacyanoferrate (II) within the pores of the resin comprises the steps of:

(a) bringing a porous anion exchange resin into contact with an aqueous solution of a water-soluble salt of hexacyanoferrate (II) so as to convert the anion exchange resin into the form of the hexacyanoferrate (II) ions followed by washing with water;

(b) bringing the anion exchange resin into contact with an aqueous solution of a copper salt to react with the hexacyanoferrate (II) ions so as to deposit a water-insoluble copper hexacyanoferrate (II) in the pores of the anion exchange resin;

(c) bringing the anion exchange resin into contact with an aqueous solution of an oxidizing agent to convert the copper hexacyanoferrate (II) into an oxidized form; and (d) bringing the anion exchange resin into contact with an aqueous solution of a reducing agent in the presence of monovalent cations such as potassium ions and with an aqueous solution containing copper ions either simultaneously or successively.

Further, the present invention provides a method for the regeneration of an ion exchanger for cesium ions consisting of a porous anion exchange resin supporting a water-insoluble copper hexacyanoferrate (II) within the pores and containing cesium ions adsorbed thereon which comprises the steps of:

(e) bringing the ion exchanger into contact with an aqueous solution of an oxidizing agent to effect desorption of the cesium ions from the ion exchanger; and (f) bringing the ion exchanger into contact with an aqueous solution of a reducing agent in the presence of monovalent cations such as potassium ions and with an aqueous solution containing copper ions either simultaneously or successively.

DETAILED DESCRIPTION OF THE PREFERRED EMBODIMENTS

Figure 1:
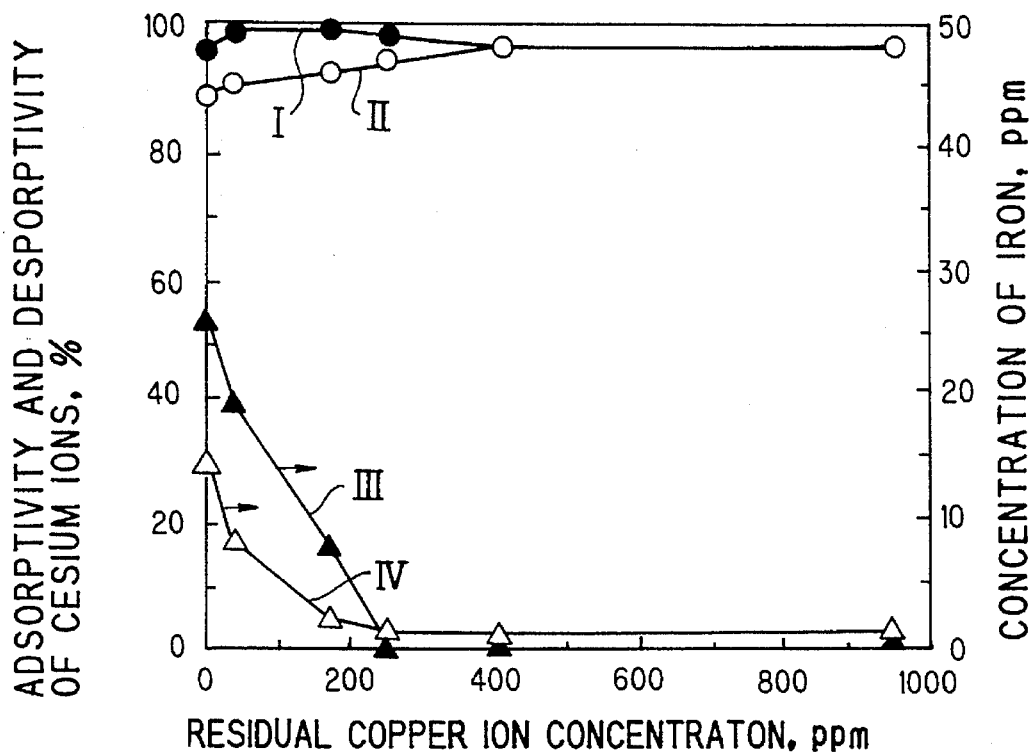
FIG. 1 is a graph showing the adsorptivity or desorptivity of cesium ions in the adsorption treatment or desorption treatment in the second time, respectively, and the concentration of iron in the aqueous medium after the adsorption treatment or desorption treatment of cesium ions in the second time as a function of the residual concentration of copper ions in the reducing treatment for the regeneration of the ion exchanger according to the inventive method.

The inventor has conducted extensive investigations as being led by an idea that, while the water-insoluble copper hexacyanoferrate (II) supported on a porous anion exchange resin prepared by conventional methods is mostly in the form of a simple salt of the formula $Cu_2Fe(CN)_6$, a high adsorptivity of cesium ions could be obtained from the initial stage of the adsorption treatment if the species supported on the anion exchange resin is in the form of a double salt. On the other hand, the inventor has discovered, as is mentioned above, that a crystalline form of $A_2Cu_3[Fe(CN)_6]_2$ can be obtained by reducing the crystalline form of $Cu_3[Fe(CN)_6]_2$ under suitable conditions provided that monovalent cartons $A^+$ are present in a sufficient amount in the medium.

Directing his attention to this fact, the inventor has discovered that an ion exchanger supporting a water-insoluble copper salt of hexacyanoferrate (II) in the pores of a porous anion exchange resin to exhibit high adsorptivity for cesium ions from the initial stage can be obtained when water-insoluble copper hexacyanoferrate (II) supported on a porous anion exchange resin is subjected to an oxidation treatment to form crystals of $Cu_3[Fe(CN)_6]_2$ within the pores followed by a reducing treatment in the presence of monovalent cations. The ion exchanger prepared in this manner has a defect that elution of iron takes place to some extent in the adsorption treatment of cesium ions from an aqueous solution containing nitric acid in a high concentration in the presence of an antioxidant or in the desorption treatment of cesium ions therefrom with an aqueous solution containing nitric acid in a high concentration and containing nitrous acid.

A presumable mechanism for the above mentioned defective phenomenon is that, due to the high adsorptivity of the ferrocyanide ions to the anion exchange sites of the anion exchange resin, the $Cu_3[Fe(CN)_6]_2$ crystals cannot be completely reduced into the double salt form of $A_2Cu_3[Fe(CN)_6]_2$ but partly reduced according to the following equation to cause desorption of the ferrocyanide ions from the anion exchange sites by means of the nitrate ions in a high concentration present in the medium for the adsorption and desorption of cesium ions:

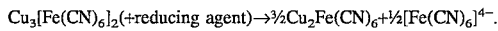

$Cu_3[Fe(CN)_6]_2 (+\text{reducing agent}) \rightarrow \frac{3}{2}Cu_2Fe(CN)_6 + \frac{1}{2}[Fe(CN)_6]^{4-}$.

As a result of the extensive investigations, the inventor has arrived at a discovery that elution of the ferrocyanide ions from the ion exchanger can be decreased in the adsorption and desorption treatments of cesium ions when the reducing treatment is conducted in the presence of copper ions and monovalent cations in combination or when the reducing treatment is conducted in the presence of monovalent cations followed by a treatment with copper ions. This principle is applicable also to the regeneration treatment of the ion exchanger.

In the inventive method, the porous anion exchange resin to be used as the base of the ion exchanger is not particularly limitative and any commercial products of macroporous anion exchange resins can be used without particular limitations. The oxidizing agent used in step (c) of the inventive method can be any of the oxidizing compounds capable of converting the water-insoluble hexacyanoferrate (II) into copper hexacyanoferrate (III) without decomposition of the anion exchange resin and the hexacyanoferrate (II) ions. An example of suitable oxidizing agents is an aqueous solution of nitric acid containing nitrous acid.

The reducing agent used in step (d) of the inventive method should have a strong reducing activity even in an acidic medium and can be selected from those disclosed in Japanese Patent Kokai 5-254828. In particular, hydrazinium salts and hydrazine hydrates capable of forming hydrazinium ions in an acidic medium are preferred because they are hardly precipitated even in the presence of copper ions so that the treatment with copper ions can be conducted concurrently with the reducing treatment.

The amount of copper ions added to the medium should be at least 200 ppm as the residual concentration in the medium. An excessive amount of copper ions, however, is undesirable and under limitation because the double salt of $A_2Cu_3[Fe(CN)_6]_2$ is converted thereby into the simple salt of $Cu_2Fe(CN)_6$ to cause a decrease in the fraction of the double salt form desirable in respect of the adsorptivity for cesium ions. It is preferable that introduction of copper ions is preceded by the addition of a potassium salt or copper ions are introduced concurrently with a potassium salt so as to suppress formation of the simple salt form. The concentration of the potassium salt should desirably be as high as possible with the saturation concentration as the upper limit.

An additional advantage is obtained when the reducing treatment is conducted in the presence of copper ions although the mechanism therefor is not understood. Namely, the desorptivity for cesium ions can be somewhat enhanced as compared with the reducing treatment in the absence of copper ions.

The ion exchanger prepared in the above described manner and bearing cesium ions adsorbed by the water-insoluble copper hexacyanoferrate (II) can be regenerated according to the inventive procedure. Thus, the ion exchanger bearing cesium ions is subjected to an oxidizing treatment to cause desorption of the cesium ions and the ion exchanger freed from cesium ions is subjected to the reducing treatment in the same manner as in the preparation of the ion exchanger. The method of regeneration according to the invention is applicable not only to the ion exchanger prepared by the inventive method but also to any ion exchangers based on a porous anion exchange resin supporting water-insoluble copper hexacyanoferrate (II) prepared by a conventional method.

It is a remarkable fact that the water-insoluble hexacyanoferrate (II) in the form of precipitates is little isolated from the resin or formed in the aqueous medium throughout the process including the oxidizing and reducing treatments for the preparation of the ion exchanger, the adsorption and desorption treatments of cesium ions and regeneration of the ion exchanger.

In the following, examples are given to illustrate the present invention in more detail.

EXAMPLE 1

Into a screw-stoppered Erlenmeyer flask of 25 ml capacity, referred to hereinafter simply as a flask if not otherwise specified, was taken a porous anion exchange resin (Bio-rad AGMP-1, a product by Bio-Rad Laboratories) having a particle size distribution of 50 to 100 mesh in an amount of 0.1 g (based on the resin after drying at 60° C.). The ion exchange resin particles were suspended in 1 ml of a 0.5M aqueous solution of $K_4Fe(CN)_6$ and the flask containing the suspension was shaken in a thermostat at 25° C. for 2 hours. Thereafter, the suspension was filtered under suction through a membrane filter of poly(tetrafluoroethylene) resin mounted on a 15 ml membrane holder having a diameter of 25 mm and the ion exchange resin particles on the filter membrane were repeatedly washed with water until no ferrocyanide ions could be detected in the washings. Then, the resin particles on the filter membrane were entirely washed down with 3 ml of a 1M aqueous solution of copper nitrate into a flask and the suspension in the flask was shaken at 25° C. for 24 hours followed by filtration in the same manner as above and washing of the resin particles with water until no copper ions could be detected in the washings.

The thus obtained resin particles, which supported copper hexacyanoferrate (II) in the pores of the resin particles, referred to as AGMP1-CuFC hereinafter, were subjected to the elementary analysis for copper and iron to find that the resin particles contained 0.315 g of $Cu_2Fe(CN)_6$ as the adsorbate per g of the starting anion exchange resin (based on the resin after drying at 60° C.). This AGMP1-CuFC was subjected to an oxidation treatment and then reduction treatment in the following manner to give an ion exchanger for cesium ion separation.

Thus, the particles of AGMP1-CuFC on the filter membrane were washed down with 10 ml of a 5M nitric acid solution containing $10^{-2}M$ of sodium nitrite into a flask and the flask containing the suspension was shaken at 25° C. for 24 hours to effect an oxidation treatment followed by filtration of the suspension. After thorough washing of the resin particles on the filter membrane with water, a 10 ml portion of a 0.1M nitric acid solution containing $2\times10^{-2}M$ of copper nitrate and $1.5\times10^{-2}M$ of hydrazine sulfate was added to the membrane holder to effect a reduction treatment of the resin particles. The suspension of the resin particles on the filter membrane was periodically agitated for 1 hour until almost no bubble formation was detected in the suspension with the lower end of the filter plugged in order to prevent falling of the solution through the membrane followed by filtration and washing of the resin particles with water. The thus obtained resin particles, which served as an ion exchanger for cesium ion separation, were subjected to the adsorption and desorption tests of cesium ions in the following manner.

The resin particles on the filter membrane were washed down into a flask with 10 ml of a 3M nitric acid solution containing $2.21\times10^{-3}M$ of cesium nitrate and $1\times10^{-3}M$ of hydrazine sulfate and the flask containing the suspension was shaken at 25° C. for 1 hour to effect adsorption of the cesium ions onto the resin particles followed by filtration. After thorough washing with water, the resin particles on the filter membrane were washed down into a flask with 10 ml of a 5M nitric acid solution containing $1\times10^{-2}M$ of sodium nitrite and the flask containing the suspension of the resin particles was shaken at 25° C. for 24 hours to effect desorption of cesium ions from the resin particles. The results of the analysis of the filtrate and washings for cesium indicated that adsorption of cesium on the resin particles from the cesium nitrate-containing solution was 95.5% without including the portion removed by washing with water (hereinafter also) and desorption of cesium was 92.3% including the portion transferred into the washings (hereinafter also). The concentration of iron in the aqueous media after the adsorption treatment and after the desorption treatment was 0.3 ppm and 1.0 ppm, respectively.

Comparative Example 1

The AGMP1-CuFC obtained in the course of the experiment undertaken in the same manner as in Example 1 and held on the membrane filter was subjected as such, i.e. without undertaking the oxidation treatment and reduction treatment, to the adsorption and desorption tests of cesium ions also under the same conditions as in Example 1 to find that the adsorptivity and desorptivity of cesium ions were 80.9% and 88.3%, respectively, and the concentrations of iron in the aqueous media after the adsorption test and desorption test were 0.2 ppm and 0.5 ppm, respectively.

Comparative Example 2

The AGMP1-CuFC obtained in the course of the experiment undertaken in the same manner as in Example 1 and held on the membrane filter was subjected to the adsorption and desorption tests of cesium ions also under the same conditions as in Example 1 except that the reduction treatment was carried out by using 10 ml of a 0.1M nitric acid solution containing hydrazine sulfate in a concentration of $1.5\times10^{-2}M$ to find that the adsorptivity and desorptivity of cesium ions were 98.7% and 84.2%, respectively, and the concentrations of iron in the aqueous media after the adsorption test and desorption test were 49.9 ppm and 24.3 ppm, respectively.

The above obtained results indicate that, while the reduction treatment following the oxidation treatment has an effect to considerably increase the adsorptivity of cesium ions as compared with Comparative Example 1, presence of copper ions in the reduction treatment has an effect to somewhat improve the desorptivity of cesium ions and to greatly decrease the concentration of iron in the aqueous media after the adsorption and desorption tests by making comparison with Example 1.

EXAMPLE 2

A 0.1 g portion of another grade of a porous anion exchange resin having an effective particle diameter of 0.40 to 0.50 mm (Amberlite IRA-904, a product by Rohm and Haas Co.) was taken in a flask. Resin particles bearing copper hexacyanoferrate (II) in the pores, referred to as IRA904-CuFC hereinafter, were prepared therefrom in the same manner as in Example 1. Elementary analysis of this IRA904-CuFC for iron and copper indicated that the contents of iron and copper therein corresponded to 0.179 g of $Cu_2Fe(CN)_6$ per g of the starting anion exchange resin (based on the resin after drying at 60° C.). An ion exchanger for cesium ions was prepared from this IRA904-CuFC by undertaking the oxidation treatment and reduction treatment in the same manner as in Example 1 and subjected to the adsorption and desorption tests of cesium ions also in the same manner as in Example 1 to find that the adsorptivity and desorptivity of cesium ions were 69.7% and 95.4%, respectively, and the concentrations of iron in the aqueous media after the adsorption test and desorption test were 0.7 ppm and 1.8 ppm, respectively.

Comparative Example 3

The IRA904-CuFC obtained in the course of the experiment undertaken in the same manner as in Example 2 and held on the membrane filter was subjected as such, i.e. without undertaking the oxidation treatment and reduction treatment, to the adsorption and desorption tests of cesium ions also under the same conditions as in Example 2 to find that the adsorptivity and desorptivity of cesium ions were 67.7% and 79.4%, respectively, and the concentrations of iron in the aqueous media after the adsorption test and desorption test were 0.1 ppm and 2.4 ppm, respectively.

Comparative Example 4

The IRA904-CuFC obtained in the course of the experiment undertaken in the same manner as in Example 2 and held on the membrane filter was subjected to the adsorption and desorption tests of cesium ions also under the same conditions as in Example 1 except that the reduction treatment was carried out by using 10 ml of a 0.1M nitric acid solution containing hydrazine sulfate in a concentration of $1.5 \times 10^{-2}$M to find that the adsorptivity and desorptivity of cesium ions were 83.4% and 83.5%, respectively, and the concentrations of iron in the aqueous media after the adsorption test and desorption test were 39.2 ppm and 16.9 ppm, respectively.

The above obtained results indicate that, while the reduction treatment following the oxidation treatment has an effect to considerably increase the adsorptivity of cesium ions as compared with Comparative Example 3, presence of copper ions in the reduction treatment has an effect to somewhat improve the desorptivity of cesium ions and to greatly decrease the concentration of iron in the aqueous media after the adsorption and desorption tests by making comparison with Example 2.

EXAMPLE 3

The AGMP1-CuFC prepared in the same manner as in Example 1 and held on the membrane filter was subjected to the tests of adsorption and desorption of cesium ions and regeneration in the following manner.

Thus, the resin particles on the membrane filter were transferred into a flask by washing down with 10 ml of a 3M nitric acid solution containing hydrazine sulfate and cesium nitrate in concentrations of $1 \times 10^{-3}$M and $2 \times 10^{-3}$M, respectively, and shaken therein for 1 hour at 25° C. to effect adsorption of the cesium ions followed by filtration. After thorough washing with water, the resin particles on the membrane filter were transferred into another flask by washing down with 10 ml of a 5M nitric acid solution containing sodium nitrite in a concentration of $1 \times 10^{-2}$M and shaken therein for 24 hours to effect desorption of the cesium ions followed by filtration and thorough washing with water. The results of the analysis of the filtrate and washings indicated that the adsorptivity and desorptivity of cesium ions were 82.8% and 85.4%, respectively, and the concentrations of iron in the aqueous media after the adsorption test and desorption test were 0.12 ppm and 0.56 ppm, respectively.

Thereafter, 10 ml of a 0.1M nitric acid solution containing copper nitrate as a copper ion source in a varied concentration and hydrazine sulfate in a concentration of $1.5 \times 10^{-2}$M were added to the membrane filter holding the ion exchanger particles to effect the regeneration treatment under periodical agitation for about 1.5 hours when almost no bubbles were formed in the aqueous medium followed by filtration and washing of the particles with water.

The thus regenerated ion exchanger was subjected to second adsorption and desorption tests of cesium ions in the same manner as in the first time described above to give the results shown in FIG. 1 which is a graph giving the adsorptivity (curve I) and desorptivity (curve II) of cesium ions by the left ordinate and concentrations of iron in the aqueous media after the adsorption test (curve III) and after the desorption test (curve IV) by the right ordinate each as a function of the residual copper ion concentration excepting the plots on the axis of the left ordinate (see Comparative Example 5 below). As is understood from this graph, release of iron can be sufficiently prevented with the residual copper ion concentration of at least 200 ppm and the adsorption behavior of the ion exchanger for cesium ions is little decreased provided that the residual copper ion concentration does not exceed 1000 ppm.

Comparative Example 5

The regeneration test of the ion exchanger was undertaken in just the same manner as in Example 3 described above excepting omission of copper nitrate in the regeneration treatment to give the results given in FIG. 1 shown by the leftmost plots of the respective curves on the axis of the left ordinate corresponding to zero residual concentration of the copper ions with the concentrations of iron of 25.6 ppm and 14.8 ppm in the aqueous media after the adsorption test and desorption test, respectively.

EXAMPLE 4

The same porous anion exchange resin as used in Example 2 was brought into contact with an aqueous solution of sodium hexacyanoferrate (II) to be converted into the form of hexacyanoferrate (II) $[Fe(CN)_6]^{4-}$ followed by a treatment with an aqueous solution of copper chloride to precipitate copper hexacyanoferrate (II) within the pores of the anion exchange resin particles. By twice repeating this procedure followed by washing with water and air-drying, resin particles bearing copper hexacyanoferrate (II) within the pores of the resin particles, referred to as "air-dried IRA904-CuFC" hereinafter, were obtained, of which the contents of iron and copper corresponded to 0.213 g of $Cu_2Fe(CN)_6$ per g of the air-dried material.

A 0.1921 g portion of this air-dried IRA904-CuFC was taken in a flask and shaken together with 10 ml of a 3M nitric acid solution containing hydrazine sulfate and cesium nitrate in concentrations of $1\times10^{-3}M$ and $2.21\times10^{-3}M$, respectively, for 1 hour to effect adsorption of the cesium ions followed by filtration through a membrane filter. After thorough washing with water, the resin particles were washed down into another flask with 10 ml of a 5M nitric acid solution containing sodium nitrite in a concentration of $1\times10^{-2}M$ and shaken therein for 24 hours to effect desorption of the cesium ions followed by filtration and thorough washing of the resin particles on the filter membrane with water.

The resin particles on the filter membrane were subjected to a regeneration treatment by the addition of 10 ml of a 0.1M nitric acid solution containing $1.5\times10^{-2}M$ of hydrazine sulfate and $2\times10^{-2}M$ of copper nitrate to the membrane holder with periodical agitation until almost no bubbles were formed taking about 1 hour followed by filtration and washing with water. The same procedure as above for the adsorption and desorption of cesium ions was undertaken again and the filtrates obtained there were analyzed for the concentration of iron to find that the concentrations of iron in the aqueous media after the second adsorption treatment and after the second desorption treatment were 0.2 ppm and 2.1 ppm, respectively.

Comparative Example 6

The regeneration treatment of cesium-bearing ion exchanger was undertaken under the same conditions as in Example 4 excepting omission of copper nitrate to be added to the nitric acid solution for the regeneration treatment. The filtrates obtained there were analyzed for the concentration of iron to find that the concentrations of iron in the aqueous media after the second adsorption treatment and after the second desorption treatment were 15.6 ppm and 5.5 ppm, respectively.

EXAMPLE 5

A 0.1921 g portion of the air-dried IRA904-CuFC prepared in Example 4 was taken in a flask to which 10 ml of a 5M nitric acid solution containing $1\times10^{-2}M$ of sodium nitrite were added and the suspension was shaken therein at 25° C. for 24 hours to effect an oxidation treatment. After filtration and thorough washing with water, 10 ml of a 0.1M nitric acid solution containing $1.5\times10^{-2}M$ of hydrazine sulfate and $2\times10^{-2}M$ of copper nitrate were added to the membrane filter holding the resin particles to effect a reduction treatment with periodical agitation until almost no bubbles were formed taking about 1 hour followed by filtration and washing with water. The thus obtained ion exchanger for cesium separation was subjected to the adsorption test of cesium ions in the following manner.

Thus, the ion exchanger particles on the filter membrane were washed down with 10 ml of a 3M nitric acid solution containing $2.21\times10^{-3}M$ of cesium nitrate and $1\times10^{-3}M$ of hydrazine sulfate into a flask and the suspension was shaken at 25° C. for 1 hour to effect adsorption of cesium ions followed by filtration of the suspension and thorough washing of the ion exchanger particles with water. The analysis of the filtrate and washings for cesium indicated that adsorption of cesium on the ion exchanger particles was 52.6%.

EXAMPLE 6

An ion exchanger for cesium separation was prepared from 0.1921 g of the air-dried IRA904-CuFC prepared in Example 4 under substantially the same conditions as in Example 5 except that the reduction treatment of the resin particles was performed by using 10 ml of a 0.1M nitric acid solution containing 1M of potassium nitrate, $1.5\times10^{-2}M$ of hydrazine sulfate and $2\times10^{-2}M$ of copper nitrate. This ion exchanger was subjected to the adsorption test of cesium ions under the same conditions as in Example 5 followed by filtration and thorough washing of the particles with water. Analysis of the filtrate and washings for cesium indicated that adsorption of cesium on the ion exchanger particles was 76.2%. This result indicates, as compared with Example 5, that presence of a large amount of potassium ions in the reduction treatment is effective to substantially improve adsorptivity of cesium ions onto the ion exchanger.

Comparative Example 7

A 0.1921 g portion of the air-dried IRA904-CuFC prepared in Example 4 was taken in a flask and subjected to an adsorption test of cesium ions by shaking for 1 hour at 25° C. together with 10 ml of a 3M nitric acid solution containing $2.21\times10^{-3}M$ of cesium nitrate and $1\times10^{-3}M$ of hydrazine sulfate followed by filtration and thorough washing of the ion exchanger particles with water. Analysis of the filtrate and washings for cesium indicated that adsorption of cesium on the ion exchanger particles was 45.7%.

EXAMPLE 7

The IRA904-CuFC particles prepared in the same manner as in Example 2 and held on the filter membrane were washed down with 10 ml of a 5M nitric acid solution containing $1\times10^{-2}M$ of sodium nitrite into a flask and shaken therein at 25° C. for 24 hours to effect an oxidation treatment followed by filtration and thorough washing of the particles with water. Thereafter, 10 ml of a 0.1M nitric acid solution containing 1M of potassium nitrate, $1.5\times10^{-2}M$ of hydrazine sulfate and $2\times10^{-2}M$ of copper nitrate were added to the membrane holder containing the resin particles to effect a reduction treatment under periodical agitation until almost no bubbles were formed taking about 1 hour followed by filtration and washing with water. The thus obtained ion exchanger for cesium separation was subjected to the adsorption test of cesium in the following manner.

Thus, the ion exchanger particles on the filter membrane were washed down with 10 ml of a 3M nitric acid solution containing $2.21\times10^{-3}M$ of cesium nitrate and $1\times10^{-3}M$ of hydrazine sulfate into a flask and the suspension was shaken at 25° C. for 1 hour to effect adsorption of cesium ions followed by filtration of the suspension and thorough washing of the ion exchanger particles with water. Analysis of the filtrate and washings for cesium indicated that adsorption of cesium onto the ion exchanger particles was 82.2%. This result clearly support the conclusion that, as compared with the result in Comparative Example 3, a great improvement can be obtained for the adsorption of cesium ions from 67.7% to 82.2% by conducting the reduction treatment in the presence of potassium ions.

EXAMPLE 8

The IRA904-CuFC particles prepared in the same manner as in Example 2 and held on the filter membrane were washed down with 10 ml of a 5M nitric acid solution containing $1\times10^{-2}$M of sodium nitrite into a flask and shaken therein at 25° C. for 24 hours to effect an oxidation treatment followed by filtration and thorough washing of the particles with water. Thereafter, 10 ml of a 0.1M nitric acid solution containing 1M of potassium nitrate, $1.5\times10^{-2}$M of hydrazine sulfate and $2\times10^{-2}$M of copper nitrate were added to the membrane holder containing the resin particles to effect a reduction treatment under periodical agitation until almost no bubbles were formed taking about 1 hour followed by filtration and washing with water. The thus obtained ion exchanger for cesium separation was subjected to twice of the adsorption test of cesium ions with intervention of a regeneration treatment between the first and second runs in the following manner.

Thus, the ion exchanger particles on the filter membrane were washed down into a flask with 10 ml of a 3M nitric acid solution containing $2.21\times10^{-3}$M of cesium nitrate and $1\times10^{-3}$M of hydrazine sulfate and the suspension was shaken at 25° C. for 1 hour to effect adsorption of cesium ions followed by filtration of the suspension and thorough washing of the ion exchanger particles with water. The ion exchanger particles on the filter membrane were washed down with 10 ml of a 5M nitric acid solution containing $1\times10^{-2}$M of sodium nitrite into a flask and shaken therein at 25° C. for 24 hours to effect desorption of the cesium ions followed by filtration and thorough washing of the particles with water. Thereafter, 10 ml of a 0.1M nitric acid solution containing 1M of potassium nitrate, $1.5\times10^{-2}$M of hydrazine sulfate and $2\times10^{-2}$M of copper nitrate were added to the membrane holder containing the resin particles to effect a reduction treatment under periodical agitation until almost no bubbles were formed taking about 1 hour followed by filtration and washing with water.

Figure 2:
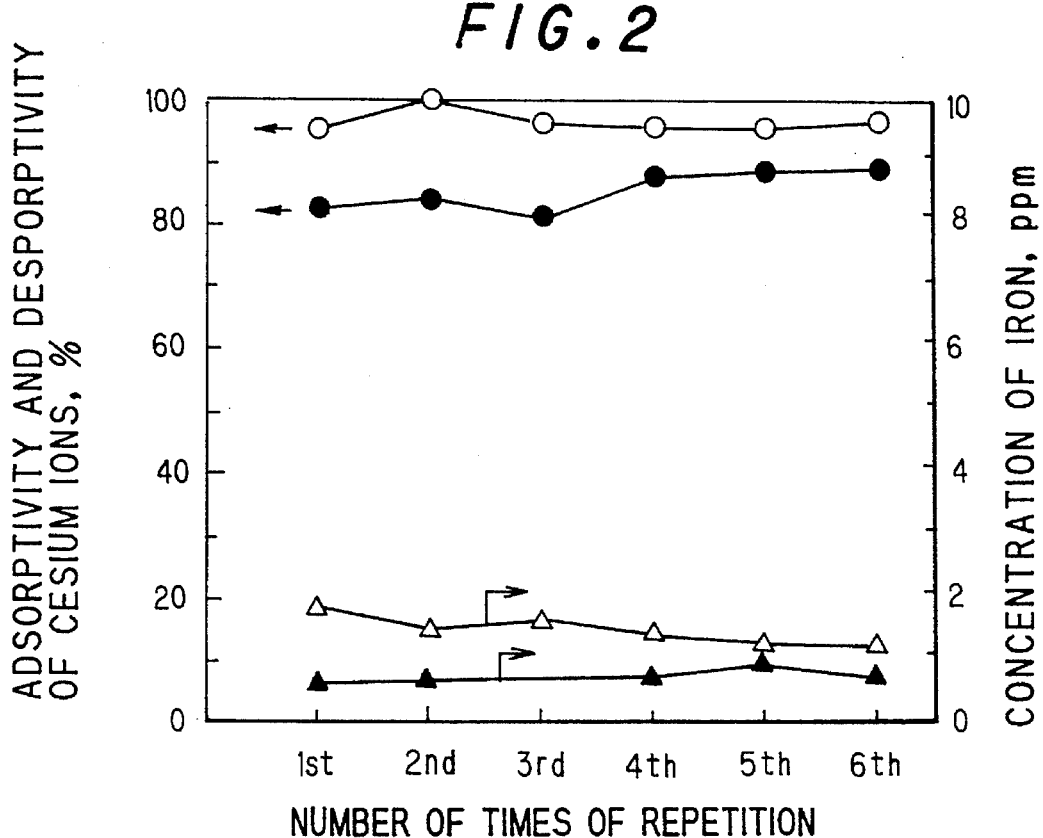
FIG. 2 is a graph showing the adsorptivity or desorptivity of cesium ions in the adsorption treatment or desorption treatment, respectively, and the concentration of iron in the aqueous medium after the adsorption treatment or desorption treatment of cesium ions for the respective number of times of repetition when the ion exchanger of the invention is repeatedly used with regeneration.

The above described cycle consisting of the steps for the adsorption of cesium ions, desorption of cesium ions and regeneration of the ion exchanger was repeated several times in the same manner as above. Analyses were undertaken after each cycle to determine the % adsorption of the cesium ions, desorption of the cesium ions and the concentration of iron in the aqueous media after the adsorption treatment and after the desorption treatment to give the results shown in the graph of FIG. 2, in which the filled-circle marks and open-circle marks are for the % adsorption and % desorption, respectively, of cesium ions and the filled-triangle marks and open-triangle marks are for the concentration of iron in the aqueous media after the adsorption treatment and after the desorption treatment, respectively. These results support the conclusion that elution of iron into the aqueous medium is very low even by repeating the treatment cycles. Further, it is understood from this figure that the concentration of copper in the aqueous medium after the treatment exhibited good constancy ranging from 1.9 ppm to 6.5 ppm with an average of 5.3 ppm in the aqueous medium after the adsorption treatment and from 10.0 ppm to 18.7 ppm with an average of 14.0 ppm in the aqueous medium after the desorption treatment. This result supports the conclusion that elution of copper ions by the ion exchange with cesium ions is relatively small presumably due to substitution of ion-exchangeable copper ions in the ion exchanger for the monovalent cations such as potassium ions and the like.

What is claimed is:

1. A method for the preparation of an ion exchanger for cesium ions consisting of a porous anion exchange resin supporting a water-insoluble copper hexacyanoferrate (II) within the pores of the resin which comprises the steps of:

(a) bringing a porous anion exchange resin into contact with an aqueous solution of a water-soluble salt of hexacyanoferrate (II) so as to convert the anion exchange resin into the form of the hexacyanoferrate (II) ions followed by washing with water;

(b) bringing the anion exchange resin into contact with an aqueous solution of a copper salt to react with the hexacyanoferrate (II) ions so as to deposit a water-insoluble copper hexacyanoferrate (II) in the pores of the anion exchange resin;

(c) bringing the anion exchange resin into contact with an aqueous solution of an oxidizing agent to convert the copper hexacyanoferrate (II) into an oxidized form; and (d) bringing the anion exchange resin into contact with an aqueous solution of a reducing agent in the presence of monovalent cations and with an aqueous solution containing copper ions either simultaneously or successively.

2. The method for the preparation of an ion exchanger for cesium ions as claimed in claim 1 in which the oxidizing agent used in step (c) is nitric acid containing nitrous acid.

3. The method for the preparation of an ion exchanger for cesium ions as claimed in claim 1 in which the reducing agent used in step (d) is a hydrazinium salt.

4. The method for the preparation of an ion exchanger for cesium ions as claimed in claim 1 in which the monovalent cations used in step (d) are potassium ions.

5. A method for the regeneration of an ion exchanger for cesium ions consisting of a porous anion exchange resin supporting a water-insoluble copper hexacyanoferrate (II) within the pores and containing cesium ions adsorbed thereon which comprises the steps of:

(e) bringing the ion exchanger into contact with an aqueous solution of an oxidizing agent to effect desorption of the cesium ions from the ion exchanger; and (f) bringing the ion exchanger into contact with an aqueous solution of a reducing agent in the presence of monovalent cations and with an aqueous solution containing copper ions either simultaneously or successively.

6. The method for the regeneration of an ion exchanger for cesium ions as claimed in claim 5 in which the monovalent cations used in step (f) are potassium ions.

* * * * *